United States Patent [19]
Douche et al.

[11] Patent Number: 5,104,230
[45] Date of Patent: Apr. 14, 1992

[54] DEVICE FOR METERING PULVERULENT MATERIALS

[75] Inventors: Jean-Pierre Douche, Thourotte; Jean-Claude Coulon, Mercurey; Pierre Bouttier, Sarcelles, all of France

[73] Assignee: Saint Gobain Vitrage, Courbevoie, France

[21] Appl. No.: 547,427

[22] Filed: Jun. 29, 1990

Related U.S. Application Data

[60] Continuation of Ser. No. 230,287, Jul. 28, 1988, abandoned, which is a division of Ser. No. 815,972, Jan. 3, 1986, Pat. No. 4,859,499.

[30] Foreign Application Priority Data

Jan. 4, 1985 [FR] France .................. 85 00052

[51] Int. Cl.⁵ ............. G01F 11/10; B01F 15/02; B65G 53/26; B65G 53/48
[52] U.S. Cl. ........................... 366/156; 222/56; 222/238; 222/630; 406/52; 406/135
[58] Field of Search ........... 366/153, 154, 155, 156, 366/158, 182, 191, 220, 221, 230, 231, 349, 151, 150, 325, 194, 117, 120, 127; 222/56, 52, 63, 64, 156, 157, 216, 217, 226, 227, 236, 238, 344, 367, 410, 630, 636, 412, 413, 185, 196, 197; 406/52, 53, 63, 135, 55, 56, 57, 64, 65, 66, 77, 79, 80; 118/308, 312; 198/493, 625

[56] References Cited

U.S. PATENT DOCUMENTS

| | | | |
|---|---|---|---|
| 1,066,665 | 7/1913 | Seward | 366/325 X |
| 2,549,908 | 4/1951 | Johansen | 222/56 X |
| 2,568,332 | 9/1951 | Genovese | 222/413 X |
| 2,674,396 | 4/1954 | Peterson | 222/227 X |
| 2,812,883 | 11/1957 | Hayford | 222/630 |
| 2,862,646 | 12/1958 | Hayford et al. | 222/630 |
| 2,878,972 | 3/1959 | Matthews | 222/630 |
| 2,924,488 | 2/1960 | Lawver | 406/52 |
| 3,091,368 | 5/1963 | Harley et al. | 222/56 |
| 3,109,680 | 11/1963 | Brooks | 406/71 |
| 3,149,759 | 9/1964 | Manley | 222/185 X |
| 3,201,001 | 8/1965 | Roberts et al. | 222/217 X |
| 3,312,151 | 4/1967 | Molins | 222/636 X |
| 3,322,957 | 5/1967 | Scoggin | 222/56 X |
| 3,494,507 | 2/1970 | Ricciardi | 222/56 X |
| 3,648,901 | 3/1972 | Cade | 222/DIG. 1 X |
| 3,669,502 | 6/1972 | Leman | 222/413 X |
| 4,227,835 | 10/1980 | Nussbaum | 222/636 X |
| 4,284,273 | 8/1981 | Gansewig | 272/101 |
| 4,579,252 | 4/1986 | Wilson et al. | 222/56 X |

FOREIGN PATENT DOCUMENTS

| | | |
|---|---|---|
| 1956873 | 5/1970 | Fed. Rep. of Germany . |
| 2245884 | 11/1973 | Fed. Rep. of Germany . |
| 1552044 | 11/1968 | France . |
| 2542636 | 9/1984 | France . |
| 341739 | 7/1972 | U.S.S.R. . |
| 1186113 | 4/1970 | United Kingdom . |
| 1295459 | 11/1972 | United Kingdom . |
| 1378748 | 12/1974 | United Kingdom ........ 406/135 |
| 1583064 | 1/1981 | United Kingdom . |

OTHER PUBLICATIONS

L. Bergman, *Ultrasound and its Uses in Science and Technology*, page 475, Moscow, 1956.
V. V. Prozorovsky, *Modern Meters for Volumetric Metering of Granular Materials and Systems for Controlling the Same*, pp. 40–41, Moscow, 1973.
*Soviet Encyclopedia Kleinenzyklopadie*, "Ultrasound", p. 270, Moscow, 1979.

*Primary Examiner*—Philip R. Coe
*Assistant Examiner*—Scott J. Haugland
*Attorney, Agent, or Firm*—Pennie & Edmonds

[57] ABSTRACT

The invention is in a pneumatic powder ejector comprising a suction stage and an injection stage. The suction stage includes a suction chamber (16), a venturi (14) communicating a primary gas to the suction chamber and a lateral suction input (18) offset in relation to the downstream and of the venturi. The injection stage includes a nozzle (22), an injection chamber (36) and a diffuser (38). The stages are located within and coaxially of the body of a tubular ejector. The nozzle includes a path for powder and primary gas between the suction chamber and diffuser, and is formed to provide a flow path of reduced dimension to communicate a secondary or entrainment gas between the diffuser and injection station.

16 Claims, 4 Drawing Sheets

DEVICE FOR METERING PULVERULENT MATERIALS

This is a continuation of application Ser. No. 07/230,287, filed Jul. 28, 1988, now abandoned, which is a division of application Ser. No. 06/815,972, filed Jan. 3, 1986, now U.S. Pat. No. 4,859,499.

TECHNICAL FIELD

This invention relates to the precise, metered distribution of pulverulent materials for the coating of a substrate with a thin, uniform film of pulverulent material and products which result from the pyrolysis of the pulverulent material on the substrate.

BACKGROUND OF THE INVENTION

It is known that a substrate may be coated with a film of material previously pulverized, and it is known that the coating may be applied to a substrate which previously may have been brought to a high temperature. According to one known technique of coating, the substrate heated to the high temperature may be moved at a constant speed passed a nozzle end and coated with product deposited on the substrate in the form of a solution. The deposited product (solution) is pyrolyzed upon contact with the heated substrate and the solvent carrier is simultaneously evaporated leaving the deposition of product in a fine layer.

The technique of spray coating has been found to present a major drawback. To this end, it has been found that the substrate is cooled by the sprayed product. In order to compensate for the degree of cooling of the heated substrate, it has been found necessary to heat the substrate to a temperature greater than the temperature at which the deposited product is normally pyrolyzed. The required additional heating is relatively costly; and the overall process technique has been found to produce a low yield.

According to another known process, product to be deposited may be sprayed on the glass substrate as a vapor. It has been found that the vapor dispersing technique also cools the substrate albeit to lesser degree than that degree of cooling during the liquid spray technique. Nevertheless, this technique suffers from the same problems and deficiencies, mentioned above. More importantly, the technique of spraying and vapor deposition are otherwise costly and complicated because of the requirement to carry out the process techniques in equipment providing at least complete fluid-tightness. Only in this manner will it be possible to prevent product which may be toxic from entering the environment.

Another known process concerns the dispersion of product in powder form on a substrate. This process benefits from the fact that the product does not substantially cool the substrate during dispersion, but the process in many applications suffers from a difficulty or inability to obtain a required very precise metering of product to be dispersed. The deficiency in the process technique is particularly evident, for example, in making special glasses coated with a very fine layer or film of metal oxide distributed on the heated glass. The metal oxide may be obtained by decomposition at high temperature, then oxidation of a compound initially in powder form. Examples of the special glasses include colored glasses, semireflecting glazings, glazings having a greenhouse effect and glazings having specific optical, thermal or electrical properties. The film generally may have a thickness of only several nanometers so not to alter the transparency of the glazing. The film, further, may consist, for example, of tin oxide resulting from the decomposition of a powder compound of the dibutyltin oxide type or the dibutyltin difluoride type.

The last-mentioned process also is considered to suffer from various problems and disadvantages. To this end, the castability of the products to be dispersed has been found to be poor resulting in a natural tendency to agglomerate, as well as a tendency while within a storage tank, to produce a vault effect or cavitation effect. Moreover, it has been found difficult or impossible to adequately meter the product to assure that the flow rate of product, in the form of a powder, has great instantaneous precision (not to exceed 1% variation) to maintain a constant thickness of film over the entire surface of the substrate. The control of thickness is necessary so as not to alter the transparency of the glazing and to obtain the properties required for special glasses. A variation in the precision of the flow, exceeding 1%, may result in irregularity in both appearance and color. These irregularities on the glazing may be readily observed. The variation may also result in insufficient and nonuniform optical, thermal and/or electrical performance also observed on the surface of the glazing.

Product in the form of powders have been metered by an Archimedes screw. However, it is difficult to obtain the necessary precision required to obtain a thickness of film that is constant over the entire surface of the substrate with the Archimedes screw. To this end, the evacuation flow of the powder may vary periodically each time that a thread of the screw pitch appears before the evacuation orifice.

As to metering systems which resort to the fluidizing of the powder, these systems also must provide a thorough fluid-tightness to prevent toxic powders, such as those of tin and/or fluoro compounds used in the treatment of glass substrates, from escaping the system. It may be difficult to obtain complete fluid-tightness, the requirements of which have been previously discussed.

Finally, powders which in theory have a good capability of being cast are known to have been metered by means of a device comprising a horizontal plate mounted to rotate about its axis and including a coaxial circular groove on its upper face. The metering device for powder may include a feeding bowl located above the plate and groove and spaced from the axis by a distance equal to the radius of the groove. A suction and distribution device operating under pressure, is located above the plate and similarly spaced from the axis.

Since both the feeding and distribution of powder are performed under pressure, the metering device is capable of functioning in a proper manner only when the powder is in an uncompacted and extremely fluid state. In addition, the metering device is capable of functioning at only very low rate of flows, near 1 kg/hr. Thus, the metering device of the prior art is not capable of use with powders having the characteristic of poor castability, or use under circumstances requiring a flow distribution on the order of 10 to 40 kg/hr. In addition, the metering device of the prior art cannot be used, since, under the action of the pressure, the powder will undergo compaction in the groove and in the suction and distribution instrumentality. Further, the metering device is adapted principally for batch mode operation. Further still, the metering device runs the risk of leading to variations in relation to the nominal flow, greater than the minimum instantaneous precision which may be tolerated.

SUMMARY OF THE INVENTION

The invention is directed to a metering device for precise, metered distribution of pulverulent materials which eliminates or at least overcomes the drawbacks in prior art metering devices. For example, the metering device of the invention has been found to eliminate the drawbacks of the prior art relating to the capability of only slight precision of metering, the impossibility of operating continuously, limitations relating to distribution of powder at low flow rates, and the requirement of complete fluid-tightness.

According to the process of the invention, powder is poured continuously into a feed bowl to maintain the level of powder in the bowl constant. The powder in the feed bowl is stirred constantly so that it does not agglomerate, but rather maintains a condition of homogeneity. The process carried out under atmospheric conditions, also includes the steps of performing continuously a volumetric metering of the powder contained in the bowl, removal of powder brought to the outer confines of the bowl pneumatically under atmospheric pressure, and dispersal of powder over a substrate.

The structure for pouring powder to maintain a level of fill may take the form of an Archimedes screw providing a metering by weight of powder. The Archimedes screw may operate with a degree of precision, but not the precision required and attained by volumetric metering of the powder removed from the bowl. Thus, the volumetric metering of powder provides further refinement of precision of metering performed by the Archimedes screw.

The apparatus of the invention for use in carrying out the process comprises a bowl fed with powder by operation of an Archimedes screw. The powder is fed continuously under conditions of atmospheric pressure, and a stirrer maintains the powder in a fluid, homogeneous condition. The bowl is an open flat-bottomed bowl, and the feeding of powder to the bowl is continuous to maintain a constant level of powder. By maintaining a constant level of powder in the bowl it is possible to avoid variation of static pressure on a groove (to be described as the description continues) and the formation of a density gradient within the thickness of the powder in the bowl. The level of powder in the bowl will be sufficiently low so that the powder located in the lower part of the bowl is not compacted under the weight of the column of powder over it.

Preferably, a flow regulator will operate in concert with the Archimedes screw to provide additional assurance that the bowl is filled with powder to a desired reference level. The level may be different for differing products and will depend essentially on the physicochemical properties of the powder (or product). The flow regulator may comprise a level detector. Thus, when the powder is at a level other than the reference level the level detector functions to control, depending on the level detected, either an acceleration or deceleration of a motor drive to the Archimedes screw. The level detector may be an optical level detector or the equivalent located in position that it does not come into contact with the powder to disturb its flow.

A central plate is situated against the bottom of the bowl and sealed to the bowl in a fluid-tight manner. The seal may be accomplished with a low coefficient of friction seal interposed between the bowl and central plate. The central plate is circular and adapted to be driven in rotation about an axis relative to the bowl. The upper face of the central plate is smoothly planar and includes at least a circular groove. The groove(s) are formed in the face of the central plate and centered on its axis. The central plate and bowl are located in an off center relationship so that a portion of the length of each groove enters into the confines of the bowl, and the remaining portion of the length is outside of the bowl.

Relative movement of the stirrer and feed bowl, and the absence of excess pressure in the bowl maintain the powder in a substantially fluid and loose form. The fluidized powder, thus, will readily fill the portion of groove within the confines of the bowl. Relative rotation between the central plate and bowl, and the action of the seal interposed therebetween, will shear excess powder from the powder within the groove to convey a precise volumetric amount of powder out of the bowl. The shearing action is accomplished without any appreciable packing of powder in the groove, and the relative rotation of central plate and bowl introduce no appreciable heating of powder to prematurely degrade the same.

Finally, the metering device includes a suction device whose orifice is located at a point along the portion of the length of the groove outside the bowl. The powder which arrives opposite the suction device has a substantially constant, relatively slight density on the order of 0.3. The powder, therefore, may be suctioned rather easily and distributed at constant flow over a substrate.

The central plate is arranged horizontally so that the feeding operation is not affected by gravity. As the apparatus has been described the conditions of operation are brought together in the bowl so that the groove is filled with powder having a constant density over time. Thus, the flow of powder which is brought by the groove to the extraction or suction device is also constant. The flow of powder will be at a high rate of flow since the feed according to the process and apparatus is continuous.

In one embodiment of the invention, the feed bowl is maintained stationary and the stirrer is rotated. In another embodiment of the invention, the feed bowl is rotated and the stirrer is maintained stationary. In each embodiment the stirrer may consist of at least one paddle fastened to a shaft. Preferably, each paddle is a shaped wire to reduce the contact surface between the paddle and powder. The reduction in contact surface also reduces the likelihood that the powder will be heated and prematurely degraded when contacting the stirrer. The likelihood of heating the powder is further reduced by rotating either the stirrer or bowl at a low speed.

In a particularly advantageous embodiment, an embodiment which successfully avoids compaction of the powder in the bowl and the vaulting phenomenon, each paddle is formed to a plane, closed loop of iron wire including two vertical arms which extend or rise upwardly throughout substantially the full volume of powder in the feed bowl. The vertical arms are located inwardly of the wall of the feed bowl and a short distance from the wall of the feed bowl. The vertical arms are connected by horizontal sections at their upper and lower ends. Each horizontal section includes a V-shaped portion substantially within the middle region, and the paddles are fastened by the V-shaped portions to a vertical drive shaft located along the axis of the bowl. The apices of the V-shaped portions extend toward one another.

It has also been found that the stirrer may comprise two blades located in two perpendicular planes, or a number of larger blades. Advantageously, the stirrer of the invention may be raised and lowered to adjust its position in relation to the bottom of the feed bowl and central plate. Any system to adjust the position of the stirrer by millimeters may be employed.

The seal interposed between the feed bowl and central plate is formed of a material which displays a good coefficient of friction. The seal is fastened or fitted on the lower free edge of the bowl and maintained in contact with the upper face of the central plate throughout its entire periphery. Contact may be assured by means of prestressed springs acting on the bowl. The force of the springs is calculated to maintain a solid contact while allowing almost free movement of the central plate. As discussed, the seal will function as an annular scraper.

The suction device includes a pipe which extends to the groove. The end of the pipe is provided with an annular seal having a low coefficient of friction. The annular seal provides a rest support for the pipe end on the upper face of the central plate.

A support plate is fastened to a frame at locations around its peripheral edge. The support plate includes openings through which the end of the bowl and the end of the pipe of the suction device which support the seals extend. Thus, the ends of the bowl and pipe of the suction device are fitted on and project through the openings in the support plate so that the projecting edges of the seals rest in sliding contact on the upper face of the central plate.

One opening in the support plate is formed by an elongated hole which straddles the two portions of the groove. Since the two portions of the groove are open to air, it is understood that the suction device can extend its action only in the region of the end of the pipe within the portion of groove located beneath the support plate. In the absence of such a hole or opening, the suction device would suction the powder found over the entire length of the groove rather than the powder located in the groove at right angles with the suction pipe. This would lead to a misadjustment of metering.

A preferred embodiment of the invention will be described as the description to be considered in conjunction with the accompanying drawing continues.

BEST MODE FOR CARRYING OUT THE INVENTION

Figure 1:
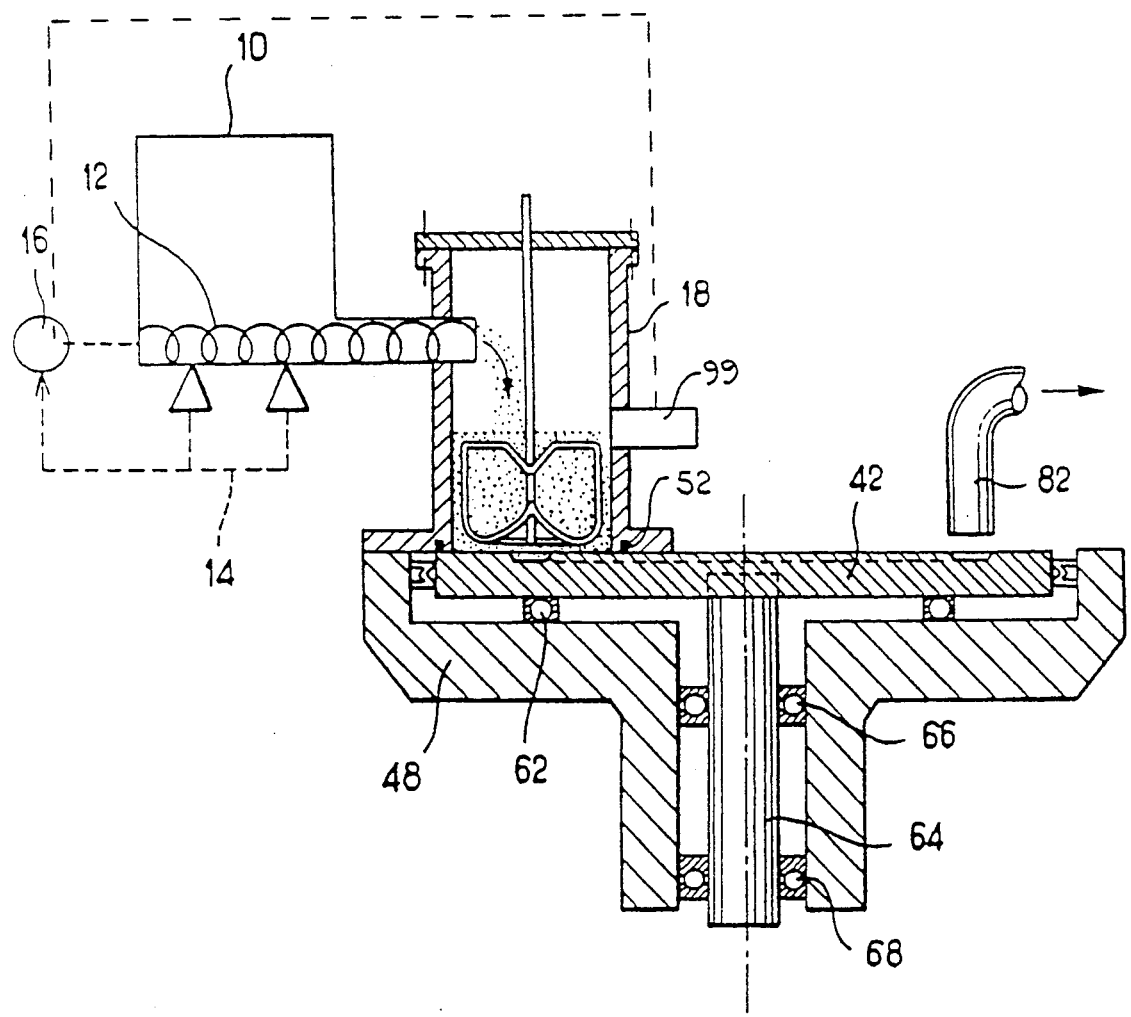
FIG. 1 is a diagrammatic view as seen in axial section illustrating the metering device of the invention and the principles of the operation.

The metering device of the invention and the system for feeding a material, such as a powder to be metered may be seen perhaps to best advantage in FIG. 1. As illustrated, the metering device comprises a hopper 10 for powder and an Archimedes screw 12 for extracting powder from the hopper. The screw through the provision of a regulator 14, as will be discussed, is capable of metering powder by weight and with an instantaneous precision on the average rate of flow lower than 1%. This precision in metering is achieved by the provision of the regulator acting on the speed of a drive motor 16 for driving the screw at constant speed or at an accelerated or decelerated speed in response to a detected flow at two points along the length of the screw.

The screw 12 feeds a bowl 18 both continuously and at a constant level. Bowl 18 of cylindrical outline including an open flat bottom is supported on a support member 48 so that the axis of the bowl is arranged vertically. A stirrer is mounted in the bowl. The stirrer has a shape specially designed to avoid the vaulting or cavitation phenomenon of the powder within the bowl. This phenomenon, as is known, is reflected by the formation of a cavity at the base of the bowl, topped with a column of powder which simply does not flow.

Figure 2:
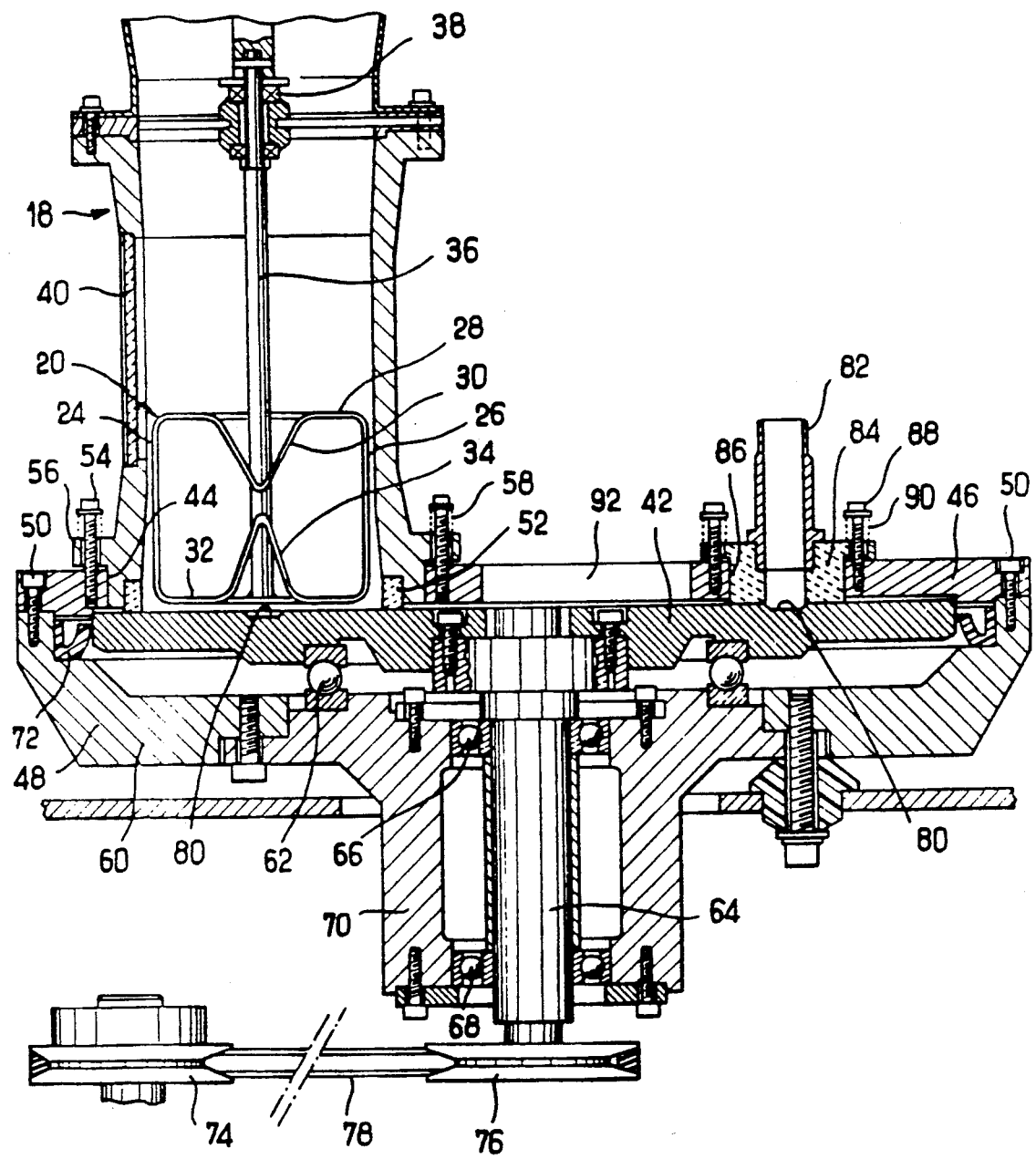
FIG. 2 is a view in axial section of a practical embodiment of the metering device; and, FIG. 3 is a plan view of the metering device of FIG. 2.
Figure 3:
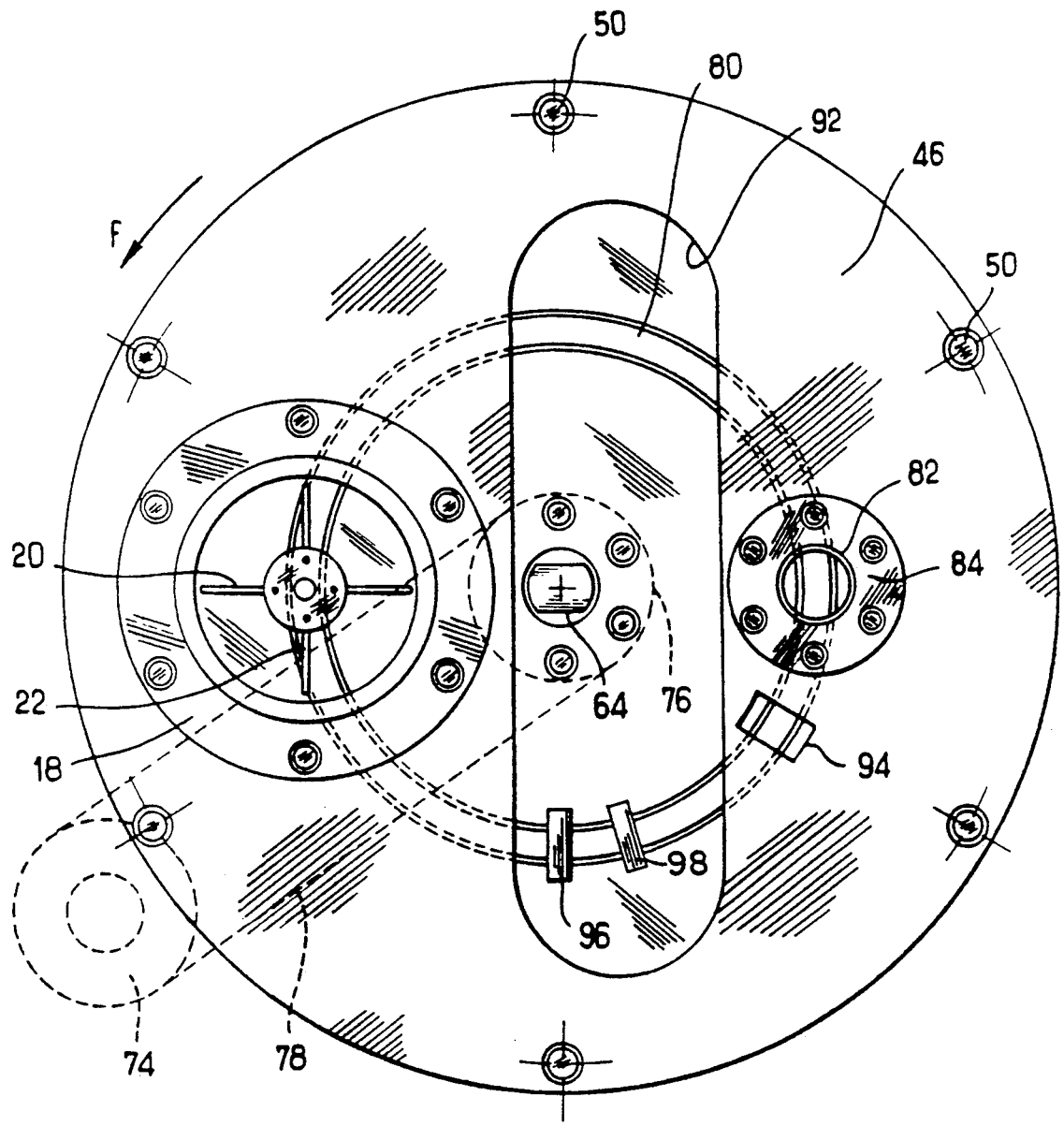

The stirrer, perhaps seen to best advantage in FIGS 2 and 3, comprises at least two paddles 20,22. The paddles are located in vertical planes, perpendicular to one another, and each paddle is shaped to the outline of a closed loop of wire. Each paddle, further, comprises two arms 24,26 which extend upwardly throughout substantially the full volume of powder in the bowl (see FIG. 1). The arms are located inwardly and a slight distance from the side wall of bowl 18. The arms are situated vertically or at a slight incline. As illustrated in the Figures the arms are situated vertically. The arms are connected by a horizontal section 28 at their upper end, and by a horizontal section 32 at their lower end. Both sections include a V-shaped portion 30,34, respectively, located at its middle, and the tip or apex of each portion is centered in relation to the axis of bowl 18. The tip of V-shaped portion 30 is directed toward horizontal section 32, and the tip of V-shaped portion 34 is directed toward horizontal portion 28.

The paddles 20,22 are each fastened at the lower end of a shaft 36. The shaft is supported by bearings 38 and driven in rotation by a motor (not shown) for driving the stirrer. However, as previously discussed, the stirrer and its paddles may remain stationary while the bowl 18 rotates. The structure for rotating the bowl may be well known. In either case, however, the bowl will remain stationary in space so that its lower free edge rests in sliding contact on the upper face of a circular central plate 42, also supported by support member 48. The central plate 42, on the other hand, is mounted to rotate around its axis, in an off-center relationship to the bowl. To this end, central plate 42 is mounted on shaft 64 which extends through an elongated opening in a vertical extension 70 of the support member. An upper bearing ring 66 and a lower bearing ring 68 are located within the elongated opening to support shaft 64 for rotation. Central plate 42 is located in a cavity in the upper portion 60 of the support member 48 and rests on a bearing ring 62 located concentric with the axis of shaft 64 about which the central plate rotates. A seal 72 seals the outer periphery of central plate 42 to support member 48.

Referring to FIG. 2, there is illustrated an arrangement for providing a rotational input to shaft 64. The arrangement includes a pulley 76 mounted at the end of the shaft and a drive pulley 74 connected thereto through a belt 78.

The upper face of central plate 42 is planed and smoothed with a great degree of precision. A groove 80 of circular outline and providing a confined disposition is formed in the upper surface of the central plate. The groove is coaxial to the central plate and has a radius approximately equal to the distance between the centers of bowl 18 and the central plate 42. In this manner, the groove enters into the region of the bowl at a right angle relative to its axis. The location of the groove within the region of the bowl defines a first position.

A window 40 (see FIG. 2) is formed in the cylindrical wall of bowl 18. The window is transparent and permits visual observation of the level of the powder in the bowl. The level of powder in the bowl may also be detected automatically by suitable means, such as an optical level detector 99, as shown in FIG. 1.

Product in the form of a powder residing in the groove 80 is removed from the groove by suction and ejected onto the surface of a substrate by substantially any known distribution device. For example, this operation has been successfully carried out by the distribution device disclosed French patent No. 2,542,636. Particularly, a suction component of the distribution device is connected to an end 82 of a pipe extending at a right angle to groove 80 at a point of the groove located outside the confines of bowl 18, at a second position. The pipe end, however, may be located in varied orientations and advantageously the pipe end may be oriented at an angle of about 30° in relation to the central plate. More specifically, the pipe end is oriented to form an angle on the order of 30° relative to a tangent to the groove at the location from which the powder is extracted. The tangent is traced in the direction of rotation of the central plate from the location. The orientations of the pipe end relative to central plate 42 effectively reduce the impact of the powder on its inner surface. In this manner clogging is avoided.

The pipe end 82 is fastened in a sleeve 84. The sleeve is comprised of a material having a low coefficient of friction like that of seal 52 sealing the bowl 18 and central plate 42 in sliding fashion. The sleeve, in turn, is fitted in an opening in support plate 46, and in rubbing fluid-tight contact on the upper face of central plate 42. The opening is located above and extends on both sides of groove 80 thereby to locate sleeve 84 and pipe end 82 immediately above the groove. The application of force on the sleeve to assure the aforementioned contact is controlled by an automatic adjustment of a play device, including pins 88 and springs 90 acting between the sleeve and support plate. A similar manner of automatic adjustment is used in the adjustment of bowl 18 on central plate 42. To this end, referring to FIG. 2, the end of bowl 18 is flanged outwardly at 56 to rest on support plate 46, while the end of the bowl extends into an opening 44. The automatic adjustment is provided by pins 54 and springs 48 acting between the flange and support plate. The support plate 46 and support member 48 are secured by a plurality of bolts 50.

Referring to both FIGS. 2 and 3, it may be seen that support plate 46 includes an opening 92, elongated to straddle two portions of groove 80. The two portions are located between bowl 18 and pipe end 82. A function of the hole is to limit the field of action of the suction device only to the portion of groove found under support plate 46, at right angles with the hole (FIG. 3). A second function of the hole is to prevent the suction of the powder directly from the bowl before it is brought under end 82.

A window 94 is formed in support plate 46, upstream from pipe end 82. The window has the intended purpose to facilitate the intake of air for suction and the creation of eddies to increase the dispersing factor of the powder. The suction and the eddying may be modulated substantially to any level by a change in the size and position of the window 94. As may also be seen in FIG. 3, a comb 96 may be employed to scrape the groove to disagglomerate the powder before it is suctioned by pipe end 82. The comb, for example, may be located in the region of opening 92.

Figure 4:
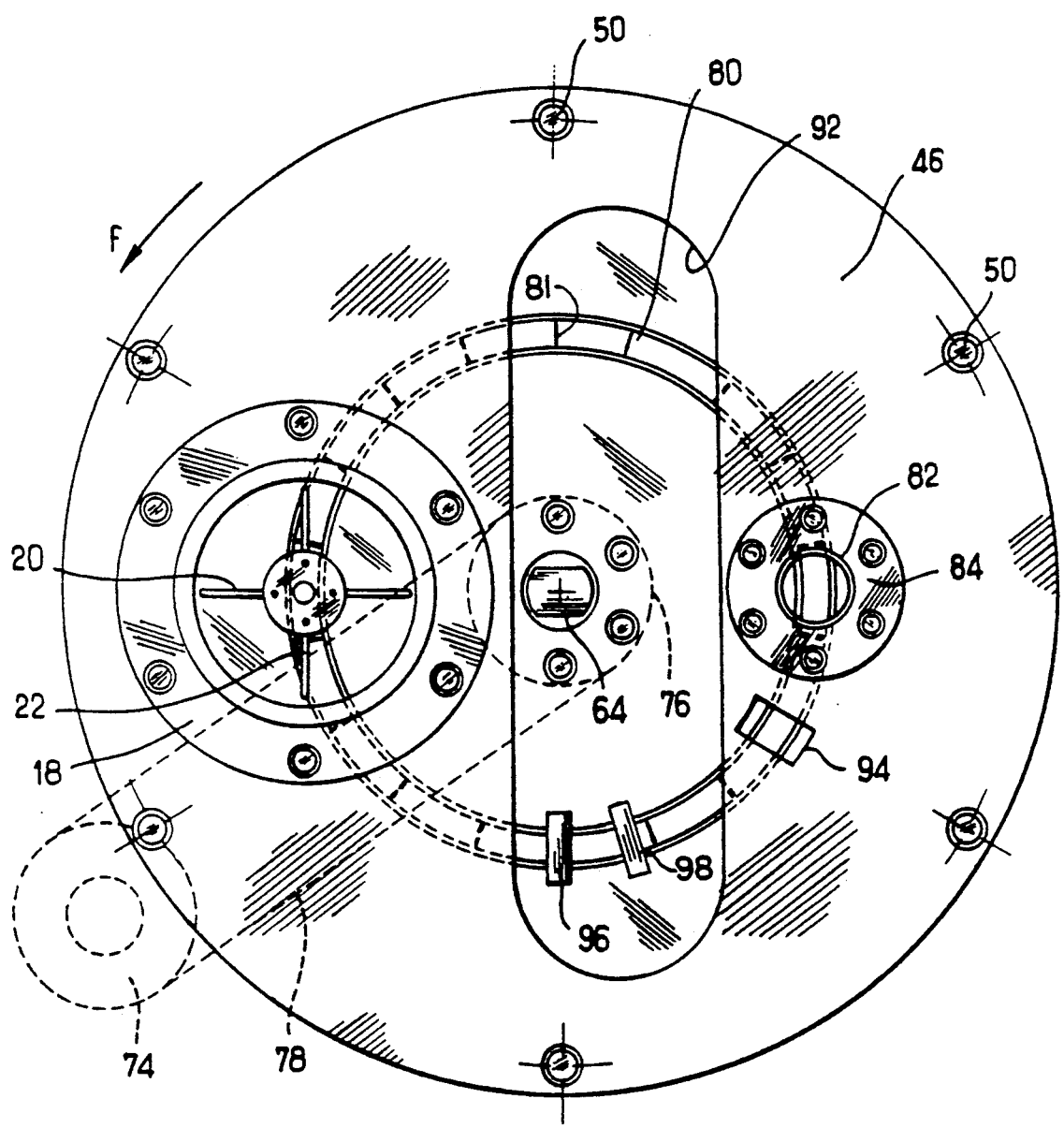

As an alternative, the disagglomerating function may be provided by an ultrasound probe 98 similarly located in the region of opening 92, as shown in FIG. 4. The ultrasound probe which likely is less sensitive than a mechanical object, such as a comb may be preferred, particularly in the case of use of powders having a propensity to adhere.

The metering device of the invention operates in a manner set out below. To this end, Archimedes screw 12 provides metering of powder by weight with a precision on an average flow of less than 1%. The powder in the metered flow is poured out continuously into bowl 18 and maintained at a constant level. The level, for example, may be determined by the top of paddles 20,22. The maintenance of a constant level will assure a constant hydrostatic pressure on the powder contained in groove 80. The maintenance of a constant level of powder will also serve to maintain constant the density of the powder.

It was previously mentioned that a regulator is responsive to a detected flow of powder at two points along the length of screw 12, and it is this regulator comprising a level detector that acts on motor 16 to accelerate or decelerate the screw.

The disagglomeration and homogenization of the powder is assured by the stirrer without any degradation in the powder. In the preferred embodiment, the stirrer and paddles 20,22 are driven at low speed. Under these conditions, the paddles fill the portion of groove 80 within the bowl with powder which is both homogeneous and of constant density.

Central plate 42 is driven at a constant speed of rotation in the direction of arrow f (see FIG. 3). This movement provides for transfer of powder previously disagglomerated by comb 96 (or the ultrasound probe) from the groove 80 to the pipe end 82. The transfer is at a constant volume flow. The powder is then suctioned to an ejection device for distribution on the surface of a substrate advancing at constant speed relative to the ejection device. The substrate may be a glass sheet heated to a temperature of about 650°. The powder on contact with the glass sheet undergoes a pyrolysis and forms a film on the glass sheet which is of absolutely constant thickness.

Modifications may be made to the metering device of the invention. For example, in an application of use requiring a periodic ejection of powder, such as the circumstance that objects in the form of bottles pass the metering device at a constant speed, it would be appropriate to operate the metering device sequentially. The sequential operation may be obtained by partitioning the groove to form a ring of honeycombs 81, shown in FIG. 4 of identical dimensions, with each honeycomb containing an amount of powder necessary to coat the bottle. Under these circumstances, if the comb 96 is used to disagglomerate the powder, it will be necessary to raise the comb periodically to pass over the partitions between adjacent honeycombs and, then, to lower the comb into a honeycomb.

We claim:

1. An apparatus for metering a pulverulent material at a first position into a confined disposition and removing the pulverulent material from said confined disposition at a second position, said apparatus comprising: support means, a central plate having an axis of rotation and at least one area remote from said axis and depressed below the surface of said central plate, said central plate mounted by said support means in a substantially horizontal disposition and adapted for rotation about said axis so as to move said at least one depressed area along a path from said first position to said second position, a receptacle adapted to store pulverulent material, said receptacle having an outlet through which said pulverulent material is adapted to flow, said receptacle being mounted by said support means such that said outlet is positioned over the path of said at least one depressed area at said first position, suction means for drawing said pulverulent material from said at least one depressed area, said suction means having an inlet through which said pulverulent material is adapted to flow, said suction means being mounted by said support means such that said inlet is positioned over the path of said at least one depressed area at said second position, means providing a first seal with a low coefficient of friction between said outlet and said central plate, wherein substantially the entire path of said at least one depressed area between said outlet and said suction means and the confines of said receptacle are maintained substantially at atmospheric pressure, means for providing a second seal with a low coefficient of friction between said inlet and said central plate, a support plate including openings adapted to receive therethrough said first seal at the outlet of the receptacle and said second seal at the inlet of the suction means, said support plate mounted to said support means around its peripheral edge, and wherein said first and second seals are fitted to project through the openings in said support plate whereby the projecting edges of said seals rest in sliding contact on the upper surface of said central plate, said support plate including at least one opening above portions of the path of said at least one depressed area between said receptacle and said suction means in both the upstream and downstream direction from said receptacle.

2. The apparatus according to claim 1, wherein the support plate includes a window formed therethrough for the introduction of air for the suction of powder from said at least one depressed area, said window disposed upstream from said suction means.

3. An apparatus for metering a pulverulent material at a first position into a confined disposition and removing the pulverulent material from said confined disposition at a second position, said apparatus comprising: support means, a central plate having an axis of rotation and at least one area remote from said axis and depressed below the surface of said central plate, said central plate mounted by said support means in a substantially horizontal disposition and adapted for rotation about said axis so as to move said at least one depressed area along a path from said first position to said second position, a receptacle adapted to store pulverulent material, said receptacle having an outlet through which said pulverulent material is adapted to flow, said receptacle being mounted by said support means such that said outlet is positioned over the path of said at least one depressed area at said first position, suction means for drawing said pulverulent material from said at least one depressed area, said suction means having an inlet through which said pulverulent material is adapted to flow, said suction means being mounted by said support means such that said inlet is positioned over the path of said at least one depressed area at said second position, means providing a first seal with a low coefficient of friction between said outlet and said central plate during rotation of said central plate, for conveying a precise volumetric amount of powder to said at least one depressed area from the receptacle without any appreciable packing of powder in said at least one depressed area or heating of powder, means for providing a second seal with a low coefficient of friction between said inlet and said central plate during rotation of said central plate, means for assuring contact of said first seal with said central plate and means independent of said first seal contact assuring means, for assuring contact of said second seal with said central plate, wherein substantially the entire path of said at least one depressed area between said outlet and said suction means and the confines of said receptacle are maintained substantially at atmospheric pressure, means for disagglomerating powder within said at least one depressed area located upstream from the suction to assist in constant flow of powder.

4. An apparatus for metering a pulverulent material at a first position into a confined disposition and removing the pulverulent material from said confined disposition at a second position, said apparatus comprising: support means, a central plate having an axis of rotation and at least one area remote from said axis and depressed below the surface of said central plate, said central plate mounted by said support means in a substantially horizontal disposition and adapted for rotation about said axis so as to move said at least one depressed area along a path from said first position to said second position, a receptacle adapted to store pulverulent material, said receptacle having an outlet through which said pulverulent material is adapted to flow, said receptacle being mounted by said support means such that said outlet is positioned over the path of said at least one depressed area at said first position, suction means for drawing said pulverulent material from said at least one depressed area, said suction means having an inlet through which said pulverulent material is adapted to flow, said suction means being mounted by said support means such that said inlet is positioned over the path of said at least one depressed area at said second position, means providing a first seal with a low coefficient of friction between said outlet and said central plate during rotation of said central plate, for conveying a precise volumetric amount of powder to said at least one depressed area from the receptacle without any appreciable packing of powder in said at least one depressed area or heating of powder, means for providing a second seal with a low coefficient of friction between said inlet and said central plate during rotation of said central plate, and means for assuring contact of said second seal with said central plate, wherein substantially the entire path of said at least one depressed area between said outlet and said suction means and the confines of said receptacle are maintained substantially at atmospheric pressure, and means for disagglomerating powder within said at least one depressed area located upstream from said suction means to assist in the constant flow of powder.

5. The apparatus of claim 3 which further includes means for maintaining a substantially constant depth of said pulverulent material in said receptacle.

6. The apparatus of claim 5 wherein said means for maintaining a substantially constant depth of said pulverulent material comprises an Archimedes screw.

7. The apparatus of claim 5 which further comprises a flow regulator for controlling said means for maintaining a substantially constant depth of said pulverulent material in said receptacle.

8. The apparatus of claim 3 which further comprises stirrer means located within the receptacle and being utilized for maintaining said pulverulent material in a substantially disagglomerated and homogenized condition.

9. The apparatus of claim 3 wherein the support means has an elongated opening exposing two portions of the depressed area located between the receptacle adapted to store pulverulent material and the suction means.

10. The apparatus of claim 3 wherein an opening is formed in the support means over a portion of the depressed area conveying powder from the receptacle to the suction means for introducing air for the suction of powder from the depressed area.

11. The apparatus of claim 4 wherein the support means has an elongated opening exposing two portions of the depressed area located between the receptacle adapted to store pulverulent material and the suction means.

12. The apparatus of claim 4 wherein an opening is formed in the support means over a portion of the depressed area conveying powder from the receptacle to the suction means for introducing air for the suction of powder from the depressed area.

13. The apparatus of claim 4 which further includes means for maintaining a substantially constant depth of said pulverulent material in said receptacle.

14. The apparatus of claim 13 wherein said means for maintaining a substantially constant depth of said pulverulent material comprises an Archimedes screw.

15. The apparatus of claim 13 which further comprises a flow regulator for controlling said means for maintaining a substantially constant depth of said pulverulent material in said receptacle.

16. The apparatus of claim 13 which further comprises stirrer means located within the receptacle and being utilized for maintaining said pulverulent material in a substantially disagglomerated and homogenized condition.

* * * * *